Fig. 1

INVENTOR.
BERRY W. FOSTER
BY
ATTORNEY

March 15, 1960

B. W. FOSTER 2,928,584

ENGINE COMPRESSOR

Filed Dec. 24, 1957

INVENTOR.
BERRY W. FOSTER

BY *A. Dunham Owen*

ATTORNEY

March 15, 1960 — B. W. FOSTER — 2,928,584
ENGINE COMPRESSOR
Filed Dec. 24, 1957 — 8 Sheets-Sheet 4

INVENTOR.
BERRY W. FOSTER
BY
A. Donham Owen
ATTORNEY

INVENTOR.
BERRY W. FOSTER
BY
A. Dunham Owen
ATTORNEY

Fig. 14.

INVENTOR.
BERRY W. FOSTER
BY
ATTORNEY

2,928,584

ENGINE COMPRESSOR

Berry W. Foster, Orange Cove, Calif.

Application December 24, 1957, Serial No. 705,469

9 Claims. (Cl. 230—56)

This invention relates to an improved engine-compressor of the piston type and to a method of operating compressors and associated mechanisms. This application is a continuation-in-part of application Serial No. 621,979 filed November 1, 1956, now abandoned, which, in turn, was a division of co-pending application Serial No. 222,368 which was filed April 23, 1951 and matured into Patent No. 2,807,136.

A feature of the invention is the division of the compressed gas into two isolated portions. The internal power that runs the compressor is obtained by burning fuel in one of these two portions. The other portion represents the output of the compressor. The compressed output gas may be stored or expanded or may be fueled and exploded, as desired.

For example, my novel piston compressor may be part of a jet engine or a gas generator or a gas turbine. The fuel may be burned in both of the isolated portions of the compressed gas when using it in these installations. The energy in the one part operates the compressor, while the energy in the other part propels the airplane or other vehicle or may be expanded through a gas turbine which generates shaft power.

Heretofore, all the heated gases were expanded together, usually in one chamber, whether the engine was of the piston type or of the turbine type. In the present invention only a portion of the total amount of fuel is burned in the compressor cylinder or in a chamber that is in communication with it at the time of burning. The rest of the fuel is burned in an isolated second portion of compressed gas outside the compressor cylinder. The result is an important simplification of engine operation and greater efficiency in the use of its power. The compressor itself, however, need not have its gas burned if that is not desired.

Suppose that the volume of the chamber that is isolated outside the compressor cylinder is $a$ and that $b$ is the volume of the compressed gas isolated in the cylinder chamber at the moment of isolation and the addition of energy. Then, if the unit masses of the compressed gas in $a$ and $b$ are $m_1$ and $m_2$, respectively, the total mass $M$ of the compressed gas will be $M = am_1 + bm_2$. The energy in the mass $bm_2$ should be as near as possible to the exact amount which, when energy is added, will compress a second mass, $M'$, to the same compression ratio by driving the piston back across the cylinder at the opposite end of the cylinder or by driving a second piston in a second cylinder by transmitting power from the first piston through a rod and crank, or by storing energy in a flywheel by means of a rod and crank, or by compressing a mass of recoil air at the opposite end of the piston which will give its energy back to the engine piston. The output energy $am_1$ is available as external power, and the operating efficiency of the engine is at its peak when $am_1$ is large in proportion to $bm_2$.

The invention may be used to supply a storage tank with compressed gas. At each stroke (or each alternate stroke) a portion of the compressed gas is isolated, energy is added, and the resultant expansion of this portion of the gas drives the compressor piston, while the rest of the compressed gas is conducted into the storage tank. The energy in the gas that drives the piston is sufficient to move it toward the other end of the cylinder and compress a like amount there or to store energy which will be returned to the piston.

My novel compressor unit may employ a free piston instead of a piston having a connecting rod and crankshaft, but the invention differs from other free-piston engines in several particulars, including the following:

(1) The compressor air is separated from the external power air before heat is added, so that only a fraction of the total amount compressed is expanded in the compressor engine.

(2) The external power air performs no work on the piston.

(3) The compressor air does all the work on the piston.

(4) The piston itself does no external work, although the heated gases, which are expanded in the compressor engine, may do some external work if that is desirable. Usually, however, this is kept to a minimum.

In all modifications of the invention the compressor piston preferably does no external work and supplies none of the external power, acting only: (1) to compress the gases and (2) in some instances to precompress the intake air to a small pressure ratio for scavenging the burnt gases. All, or practically all, the external power is supplied by the separate portion of the air which is isolated from the compressor cylinder.

A distinctive feature of the present invention as compared with that of Patent No. 2,807,136 is that the separating valve is closed at the beginning of the compression stroke and remains closed until the gas in the engine cylinder is compressed to a prescribed pressure or until the piston reaches a prescribed position in the engine cylinder. Then the separating valve is opened and part of the air is forced out of the cylinder by a substantially constant pressure flow process. After a prescribed amount of air is forced out, or at a predetermined piston position, the separating valve is again closed. This time it is held closed, as by a toggle mechanism, while a trapped remainder of air in the engine cylinder is heated to power the engine.

General operation of the invention

A supercharger scavenges a free-piston engine cylinder through intake and exhaust ports and leaves a charge of supercharged air in the engine cylinder. Recoil air or an explosion on one side of a piston or flywheel momentum forces the engine piston to its head end of the cylinder or forces two opposed pistons together. The intake and exhaust ports are closed by the movement of the engine piston as it starts its compression stroke.

The engine piston compresses the fresh air trapped in the engine cylinder up to a prescribed pressure; then a separating valve is opened and part of the high-pressure air in the engine cylinder is forced into a high-pressure air reservoir by the movement of the piston, which produces a constant-pressure flow process in the engine cylinder. When its engine piston reaches a prescribed position near the end of its compression stroke, the separating valve is forced closed.

Then fuel is injected and exploded in the portion of high-pressure air that remains trapped in the engine cylinder. The combustion may be by a constant pressure or by a constant volume process. If the engine is a single-acting engine, this heated gas in the engine cylinder expands and forces the piston to compress some recoil air at the opposite end of its piston for energy storage or a mechanical linkage of the piston to a flywheel, etc., may store energy. This stored energy may be returned to the engine piston so that it can repeat its compression stroke. If the engine is double-acting, this heated gas in the engine cylinder expands and moves the piston to compress air on the opposite side of the piston. The same cycle is repeated alternately on both sides of the piston.

The compressed air that is forced into the high-pressure reservoir may be heated by a constant-pressure process. This heated, high-pressure gas may be expanded through a turbine or other device to produce power. The exhaust gases from the turbine are mixed with the exhaust gases from the engine cylinder; these gases are expanded through the turbine for the supercharger.

When the power turbine is running at a slow speed, its exhaust gases will have high kinetic energy. This high kinetic energy gas will flow through the turbine and the supercharger, helping to produce a larger mass flow and high-pressure ratio in the supercharged air. This configuration of the turbo-supercharger free-piston engine and power turbine and the independent mechanical action of each makes a good torque converter for power output at various speeds in the power turbine.

Other objects and advantages of the invention will be better understood from the following description of some preferred embodiments as illustrated in the accompanying drawings. However, it is to be understood that the drawings and descriptions are illustrative only and are not definitive of the invention, the scope of which is stated in the appended claims.

*The semi-free piston engine compressor 20*

Figure 1:
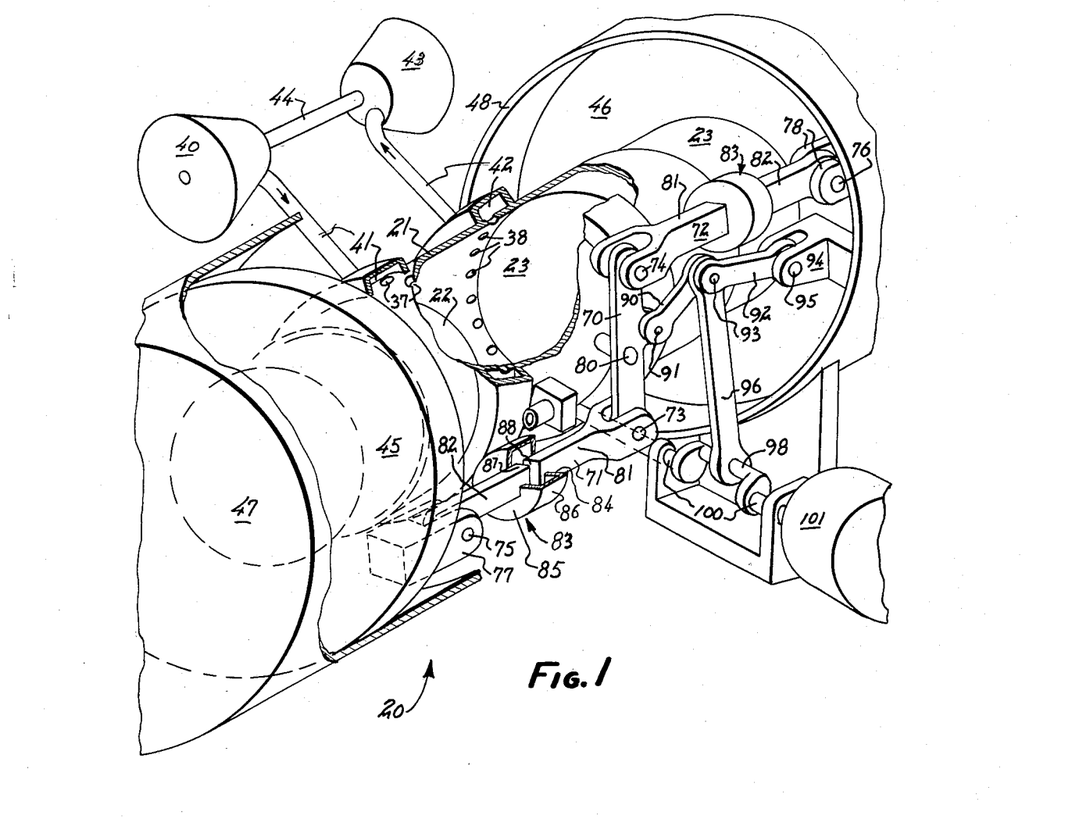
Fig. 1 is a view in perspective, with some parts broken away and shown in section, of an engine compressor embodying the principles of the present invention.
Figure 2:
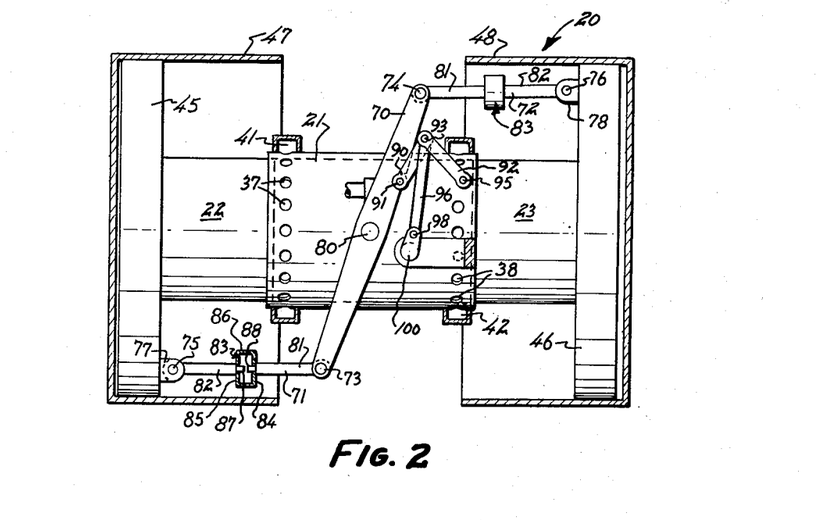
Fig. 2 is a view in side elevation and partly in section of the engine of Fig. 1 shown with the cylinders in their outer position. Some of the parts are shown somewhat diagrammatically and others are omitted, for the sake of clarity.

Figs. 1–11 show a semi-free piston engine 20 having an engine cylinder 21 in which two opposing engine pistons 22 and 23 reciprocate. The pistons 22 and 23 are synchronized by a mechanism explained below so that they move toward each other and come nearly together in the center of the cylinder 21 at one end of their stroke (Fig. 3) and then move away from each other to the other end of their stroke (Fig. 2).

The center of the engine cylinder 21 opens into a combustion chamber 24 (Figs. 4–11). A separating valve 25 opens and closes a port 26 to join the combustion chamber 24 (and the interior of the cylinder 21) with a chamber 27 and to separate the chamber 27 from the chamber 24. The chamber 27 has an outlet 28 for high pressure gas into an accumulator or other output for compressed gas. A spring 30 surrounds a stem 31 of the valve 25 and urges the valve 25 to its closed position, being compressed between a collar 32 on the stem 31 and a stationary housing member 33. In place of this mechanical spring 30 a pneumatic spring may be used. However, when the two pistons 22 and 23 move toward each other, they build up pressure in the cylinder 21 and in the combustion chamber 24. When the pressure on the combustion-chamber side of the valve 25 overbalances the spring 30, the valve 25 is opened. Compressed air or gas is then forced out through the port 26 at substantially constant pressure until a cam 34 (whose operation is explained below) forces the valve 25 closed (see Fig. 9).

Figure 3:
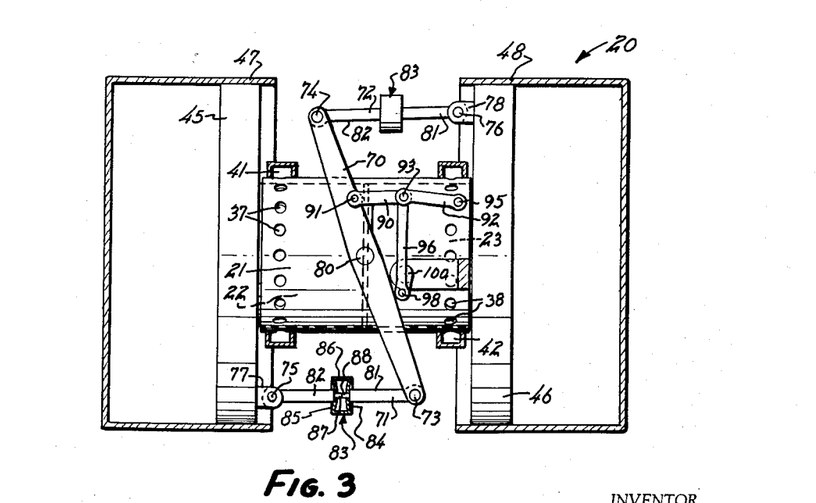
Fig. 3 is a view similar to Fig. 2, with the pistons shown in the position where they are closest to each other.
Figure 4:
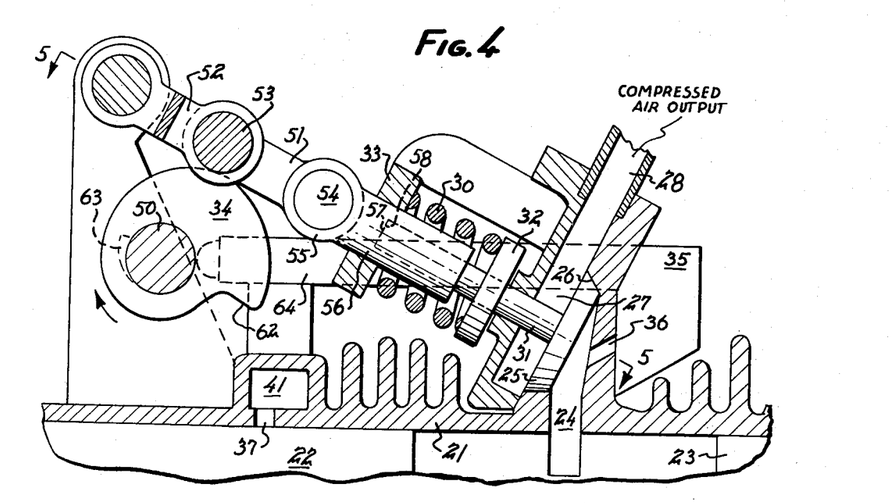
Fig. 4 is an enlarged view in elevation and in section of the separating valve and adjacent parts of the engine-compressor of Figs. 1–3.
Figure 5:
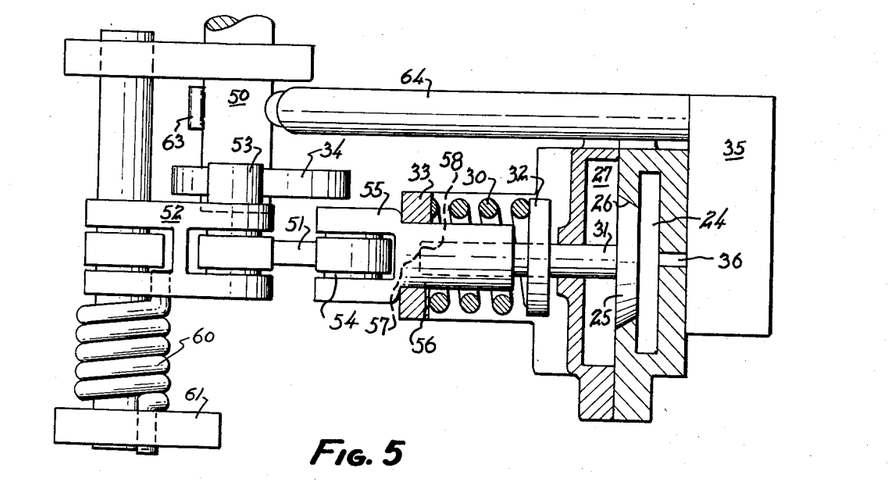
Fig. 5 is a view in section taken along the line 5—5 in Fig. 4.

When the cam 34 has forced the valve 25 closed, a fuel injector 35 sends a charge of fuel through the nozzle or port 36 into the combustion chamber 24, where the cylinder gas isolated by the valve 25 is fired to drive the pistons 22 and 23 away from each other from their Fig. 3 position to their Fig. 2 position. As they approach the extreme outer position of Fig. 2, the piston 22 uncovers an engine intake sleeve port 37, and the piston 23 simultaneously uncovers an engine exhaust sleeve port 38. A supercharger 40 then sends fresh air to the intake port 37 through a conduit 41, and the exhaust gases are scavenged out through the exhaust port 38 through a conduit 42. The hot exhaust gases may be expanded through a gas turbine 43, which may be used to supply part or all of the power that operates the supercharger 40, through a shaft 44.

The outer ends of the engine pistons 22 and 23 are rigidly secured to or made integrally with compressor recoil pistons 45, 46, which reciprocate in recoil cylinders 47 and 48. The recoil of the pistons 45, 46 acts to drive the pistons 22 and 23 back toward each other to compress the fresh charge of air. The valve 25 remains closed until pressure in the chamber 24 builds up to the predetermined value where the pressure of the spring 30 is overcome. Then the valve 25 is opened and more compressed air forced out. Thus is the cycle repeated indefinitely.

Figure 9:
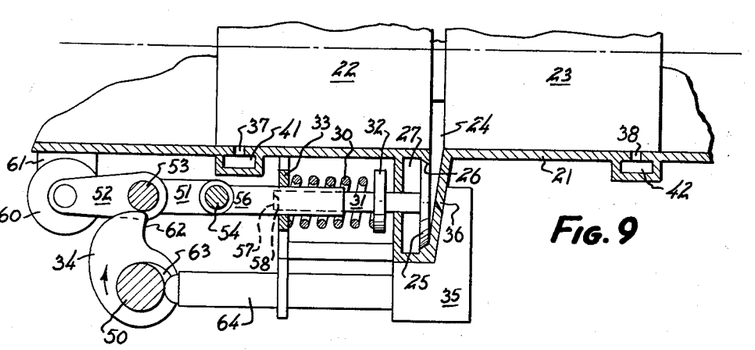
Fig. 9 is a view similar to Fig. 8 showing the engine just after the cam has forced the valve closed.
Figure 10:
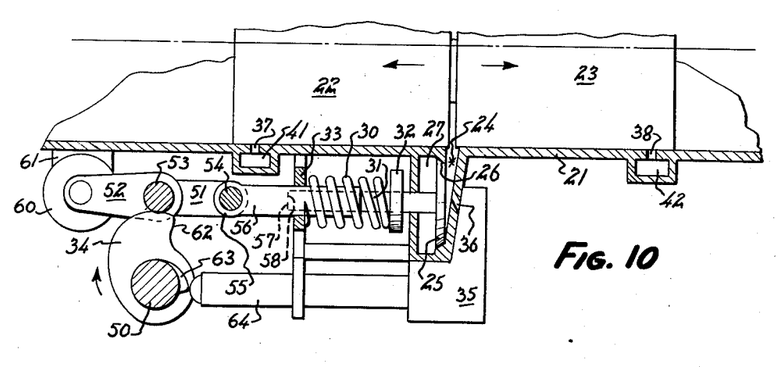
Fig. 10 is a view similar to Fig. 9 showing the engine at the innermost stroke of the pistons, at the time of fuel injection and explosion.

Since the explosion of the charge in the combustion chamber 24 builds up considerable pressure, a feature of the present invention is the provision of a toggle mechanism capable of holding the valve 25 closed against this pressure. The cam 34 is mounted on a shaft 50, whose drive and synchronization is explained below. Toggle links 51 and 52 are pivotally joined by a central pin 53 which is in engagement with the cam 34. The toggle link 51 is pivoted by a pin 54 to the yoked end 55 of a tubular sleeve 56 that fits around the valve stem 31, the end 57 of the stem 31 and the inner end 58 of the tubular passage in the sleeve 56 providing a lost motion connection between the stem 31 and the sleeve 56. The toggle link 52 is connected to a torsion spring 60, mounted on a housing member 61; so the pin or shaft 53 follows the cam 34 closely. The torsion spring 60 may comprise a helical spring locked in one position or a pair of shafts with a spring engaged between them. At the proper time for closing the valve 25, the cam 34 has a steep step-like portion 62 that engages the pin 53 and straightens the toggle links 51 and 52, forming them into a rigid rod well able to hold the valve 25 closed against the explosion pressure in the combustion chamber 24 (Fig. 9). Immediately thereafter, a cam 63, which is also on the shaft 50, engages a tappet 64 that actuates the fuel injector 35 (Fig. 10).

The engine-compressor 20 is synchronized by a lever and link mechanism (Figs. 1–3) that limits the movement of the pistons 22 and 23 toward each other by a rigid linkage and provides a flexible linkage at the extreme position of their outer strokes, where the pistons are limited by the pressure built up in the recoil cylinders 47 and 48. The principal elements are a rigid lever 70 and a pair of longitudinally compressible links 71 and 72 which are pivoted to respective ends of the lever 70 by pins 73 and 74 and are pivotally secured by pins 75 and 76 to brackets 77 and 78 that are rigidly mounted on the recoil pistons 45 and 46.

The rigid lever 70 is centrally pivoted on a bearing or stub shaft 80 that is rigidly secured to the cylinder 21. Each link 71 and 72 comprises two collinear rigid members 81 and 82 joined by a spring connector 83. The connector 83 may comprise a pair of disc springs 84 and 85 joined by a cylindrical ring 86; hence the links 71 and 72 are flexible longitudinally but are rigid against side loads (see Fig. 1). Each link member 81 and 82 terminates in a stop 87, 88 to limit the flexible longitudinal shortening of the links 71 and 72 (Figs. 2 and 3).

A toggle linkage is provided between the lever 70 and the engine housing. This toggle linkage may comprise a link 90 pivoted to the lever 70 by a pin 91 and a link 92 pivoted to the link 90 by a pin 93 and to a bracket 94 on the engine housing (recoil cylinder 48, in this case, for example) by a pin 95. A connecting rod 96 may be pivoted by pin 93 to the toggle link 92 and to a crank pin 98 that is joined to a crankshaft 100. The crankshaft 100 drives or may be unitary with the camshaft 50, which times the engine.

The crank-rod-toggle mechanism just described accomplishes several important functions. For example, when the pistons 22 and 23 are at or near the extreme outward limit of their stroke, as shown in Fig. 2, the pivot pins 80, 91, and 93 are nearly in a straight line. So the pistons 22 and 23 can move further apart without putting any significant load on the connecting rod 96. Also, the springs 83 can stretch. This unique arrangement enables the recoil springs 45, 47 and 46, 48 to absorb most of the piston kinetic energy, with very little being stored in the elastic synchronizing mechanism. On the other hand, when the pistons 22, 23 are at the inner limit of their stroke (Fig. 2) the toggle links 90 and 92 are almost straight; so a very small load on the crankshaft 100 and connecting rod 96 will prevent the lever 70 from rotating any further in the counterclockwise direction. Also, the stops 87 and 88 engage and make the links 71 and 72 rigid compression members. Thus the toggle link and synchronizing mechanism provide a possible minimum clearance between the pistons 22 and 23. There will never be any impact between the pistons 22 and 23; so very close clearances can be maintained on the compression stroke.

The crank and toggle synchronizing mechanism may also be used to start the semi-free piston engine by means of a starting motor 101 secured on the crankshaft 100. The motor 101 may be electrical, hydraulic, or any other suitable type.

The non-uniform motion of the camshaft 50, caused by the non-uniform motion of the crankshaft 100—i.e., non-uniform with respect to the motion of the pistons 22 and 23—gives a good relative motion to the cams 34 and 63, so that their dynamic lifting loads are less than would be the corresponding loads on simple harmonic motion. Between Figs. 8 and 10, the piston movement is small, but the cam 34 rotates about 45°, so that the proper timing adjustment is easy.

*Operation of the engine-compressor 20 of Figs. 1–11*

The starting motor 101 may be used to start the engine-compressor 20 by driving it through the crankshaft 100, the connecting rod 96, the toggle links 90 and 92, the lever 70, and the links 71 and 72, which are pivoted to the semi-free pistons 22 and 23. When the engine-compressor 20 has been started, the starter 101 is disengaged in the normal manner.

Figure 6:
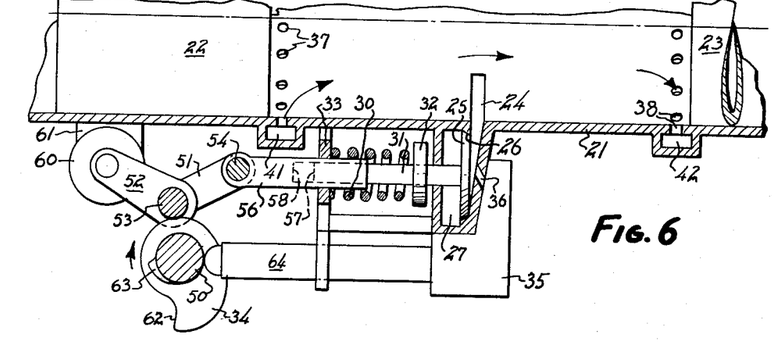
Fig. 6 is a view in elevation and in section of a portion of the engine adjacent the separating valve, on a smaller scale than Fig. 4 and showing the engine in a position at the start of a cycle where the pistons are at the recoil end.

When the pistons 22 and 23 are far apart, as in Figs. 2 and 6, the turbo-supercharger 40 sends air through the conduit 41 and the sleeve intake port 37. The fresh air enters the cylinder 21 and scavenges the burnt exhaust gases out through the exhaust post 38 and conduit 42 into the gas turbine 43, where they are expanded to drive the turbine 43 and thereby the supercharger 40. At this stage the air pressure in the compressed gas accumulator 27 and the spring 30 overbalance the pressure in the combustion chamber 24 and hold the valve 25 closed.

The recoil air in the cylinders 47 and 48 now acts on the pistons 45 and 46 to force them toward each other, thereby forcing the engine pistons 22 and 23 toward each other. The movement of the pistons 45 and 46 moves the links 71 and 72 to swing the lever 70 counterclockwise in Fig. 2, and this motion begins to straighten out the toggle 90, 92 and causes the connecting rod 96 to turn the crankshaft 100 and the camshaft 50 clockwise in Figs. 2 and 6. Eventually this rotation of the camshaft 50 will operate the valve 25 and fuel injector 35, at the proper times. If desired, the crank shaft 100 may be used for auxiliary power drives, such as pumps, generators, etc., but preferably the crankshaft power is kept to a small fraction of the total power of the engine 20.

Figure 7:
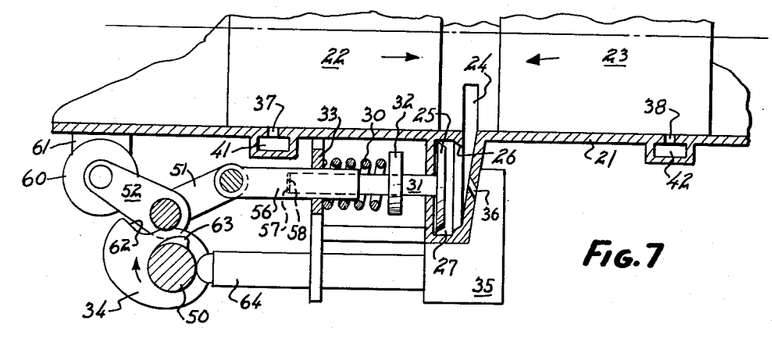
Fig. 7 is a view similar to Fig. 6 showing the pistons slightly beyond the position where the pressure in the cylinder has forced open the separating port.

As the pistons 22 and 23 move from their Fig. 6 position to their Fig. 7 position, they cover the intake and exhaust ports 37 and 38. The air trapped in the engine cylinder 21 is then compressed between the pistons 22 and 23. Between Figs. 6 and 7 the pressure of gas in the cylinder 21 builds up until it overcomes the pressure of the spring 30 and in the chamber 27, and then it opens the valve 25, as shown in Fig. 7. There, compressed air from the engine cylinder 21 flows through the port 26 into the chamber or accumulator 27 by a substantially constant-pressure process.

Figure 8:
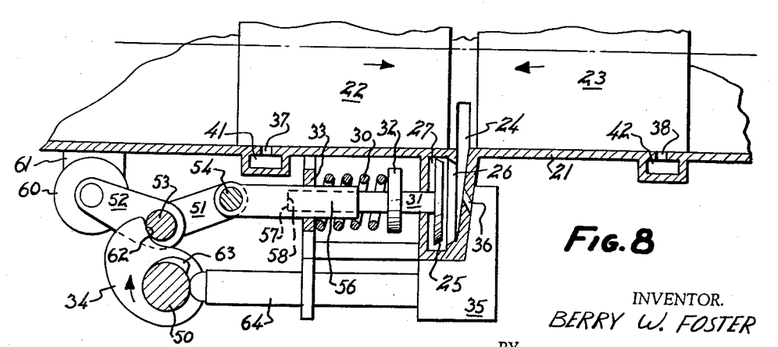
Fig. 8 is a view similar to Fig. 7 showing the engine in the position where the valve-closing cam is just beginning to operate.

At the position shown in Fig. 8, the steep portion 62 of the cam 34 engages the pin or shaft 53 and within a very few degrees of rotation forces the valve 25 to its closed position, shown in Fig. 9. The closure is effected by forcing the pin 53 up, straightening the toggle links 51 and 52; for the wall 56 in the sleeve 55 engages the valve stem 31 and moves it to the right quickly.

After the valve 25 has closed, at the Fig. 9 position, the pistons 22 and 23 move still closer together to the position shown in Figs. 10 and 3, where the stops 87 and 88 engage and where the toggle arms 90 and 92 are almost in a straight line. This compresses the engine cylinder gas to a still greater value. In the meantime, the cam 63 forces the tappet 64 to the right, actuating the fuel injector 35, which sends a charge of fuel through the nozzle or port 36 into the combustion chamber 24.

Figure 11:
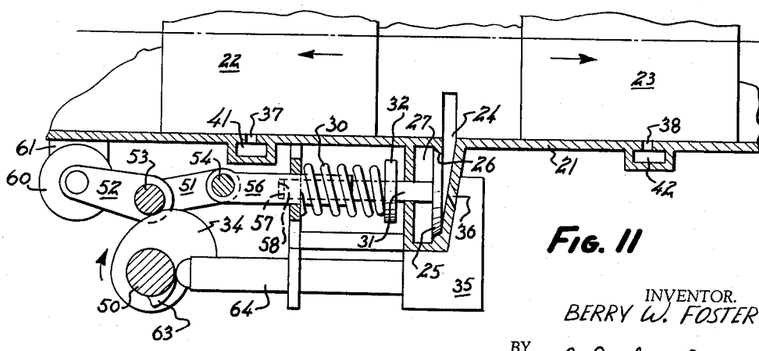
Fig. 11 is a view similar to Fig. 10 showing the engine after explosion, with the pistons moving outwardly.

The fuel explodes (spark ignition may be used, but is not necessary), and the exploded and heated gases expand and force the pistons 22 and 23 apart, as shown in Fig. 11. During this time the cam 34 holds the toggle links 51 and 52 in a straight line, keeping the valve 25 closed. The cam 34 is curved to gradually release the toggle and eventually to restore control of the valve 25 to the spring 30 at a time when the pressure in the engine cylinder 21 is too low to force the valve 25 open. In other words, during the actual firing, when the greatly increased pressure might tend to force the valve open, the toggle linkage reinforces the valve 25 and holds it closed, while after the pressure has subsided where it is below the level needed, the spring 30 is sufficient and therefore the lost-motion connection is reinstated to permit later opening of the valve 25 when the pressure of the gases overcomes the force of its spring 30. The compressed gas in the accumulator 27 may be used as desired, and the engine moves from the Fig. 11 position to that of Fig. 6, beginning a new cycle.

As shown in Fig. 2, when the pistons 22 and 23 are at the outer limits of their strokes, the pinned joints 80, 91, and 93 are nearly in a straight line; so any small rotation of the lever 70 about the bearing 80 that may deviate slightly from its Fig. 2 position has very little effect on the connecting rod 96 and places very little load on it. By this unique arrangement practically all the kinetic energy of the pistons 22 and 23 is taken up by the recoil pistons 45 and 46. The flexible joints 83 have only light spring loads, equal to the small synchronizing loads and the camshaft loads.

When the pistons 22 and 23 are in the Fig. 3 position, a minimum clearance between them is maintained by the stops 87 and 88. The toggle links 90 and 92 are guided by the crankpin 98 and the connecting rod 96 so that the pinned joints 91, 93, and 95 approach a straight-line arrangement but can never buckle through beyond the line. Under normal operating conditions the compression and explosion pressure in the engine cylinder 21 is sufficient to stop the inward motion of the engine pistons 22 and 23; so there is very little compression load on the springs 83. Also, normally, the crankshaft 100 has an inertia wheel (not shown) to help it keep rotating clockwise.

*A twin free-piston compressor with double action*
*(Figs. 12 through 14)*

Figure 12:
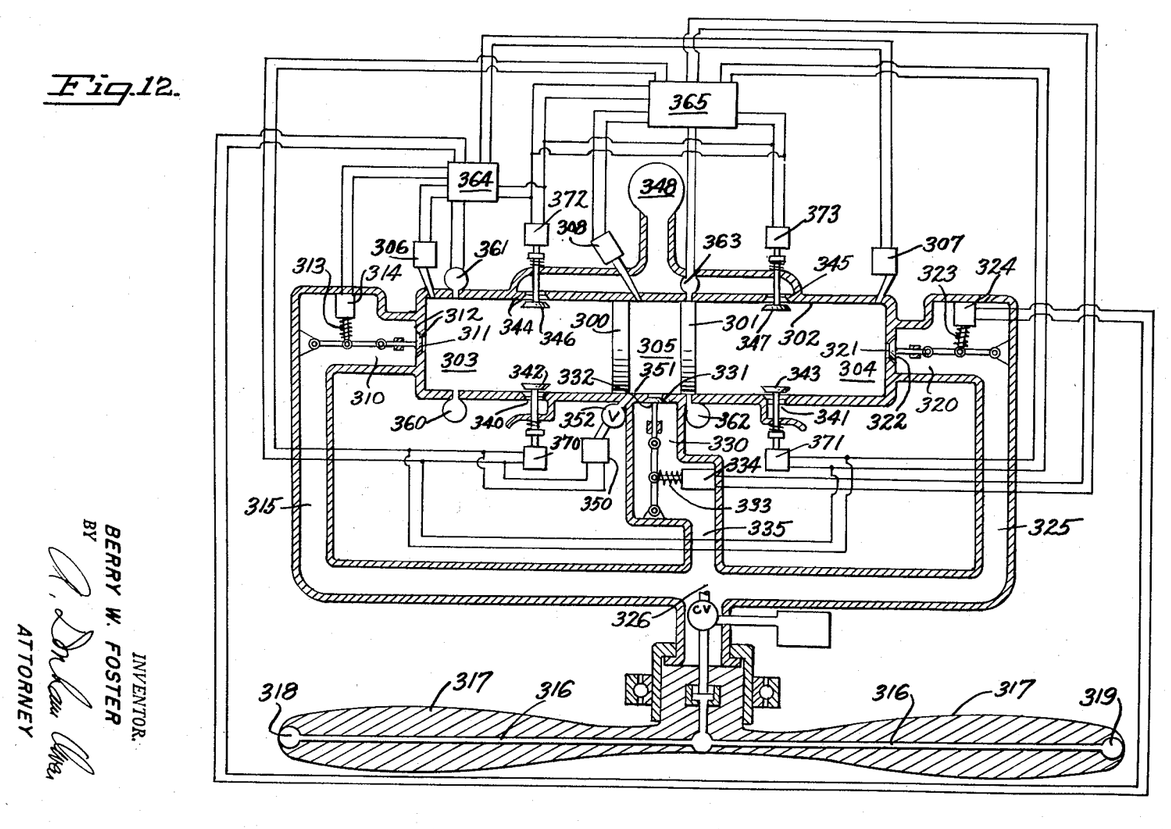
Fig. 12 is a diagrammatic view of a modified form of the invention showing a compressor embodying the principles of the invention, having twin free pistons and one cylinder supplying unexploded compressed air directly to a propeller. The device is shown in starting position.
Figure 13:
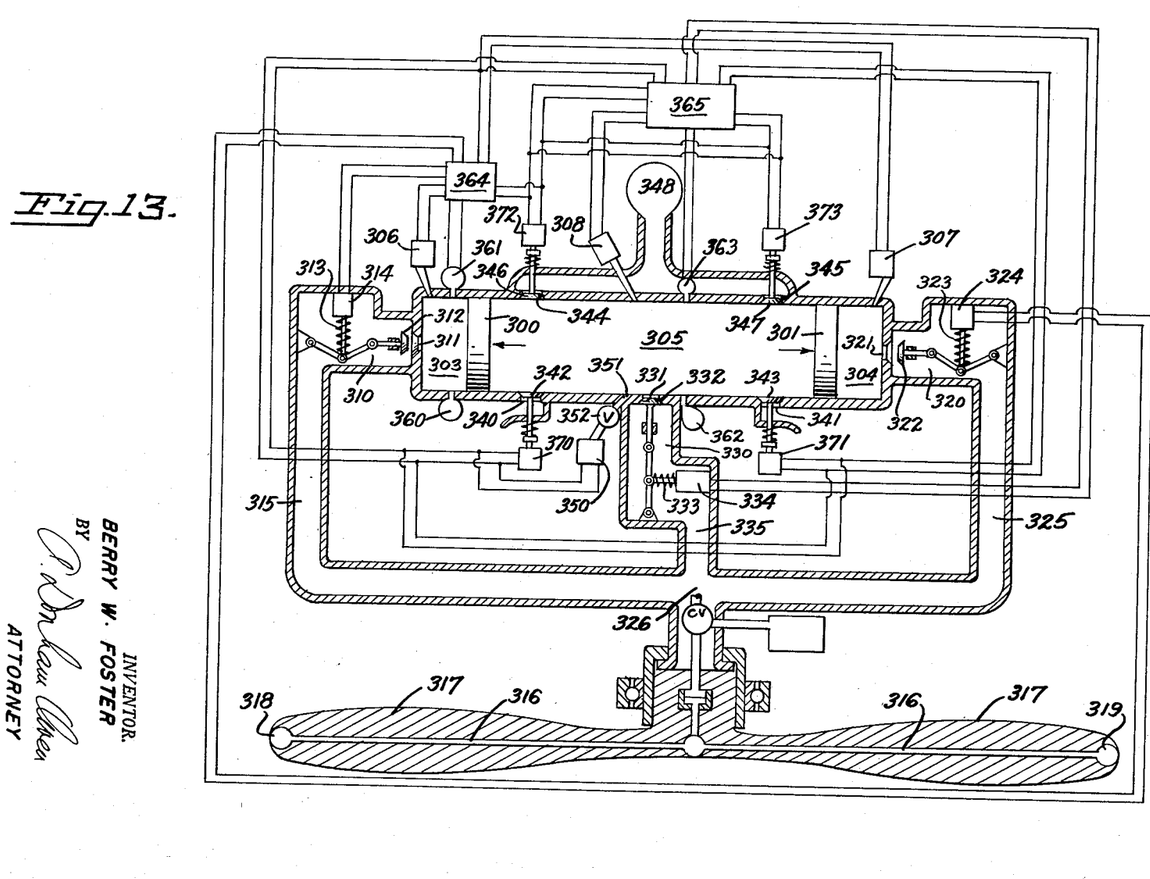
Fig. 13 is a view similar to Fig. 12 with the pistons shown near the end of their outer stroke.
Figure 14:
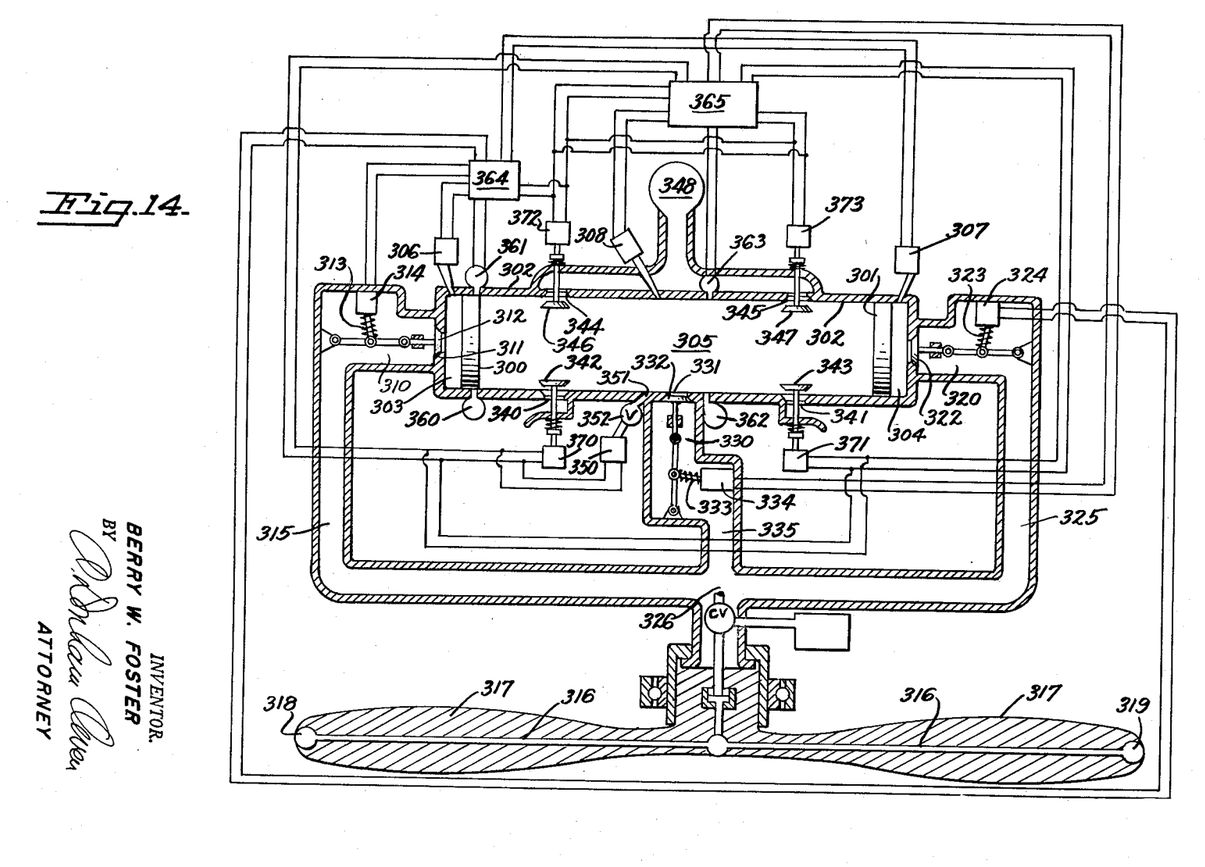
Fig. 14 is a view similar to Fig. 12 with the pistons shown at the end of their outer stroke.

A two-stroke double-acting compressed-gas generator is illustrated in Figs. 12 through 14. Two opposed pistons are used in this design; so the engine will be in dynamic balance without vibration.

Free pistons 300 and 301 reciprocate in a cylinder 302. At the left-hand end of the cylinder 302 are an engine chamber 303 and a compressor output chamber 310; at the right-hand end of the cylinder 302 are another engine chamber 304 and a compressor output chamber 320. In the center of the cylinder 302 is an engine chamber 305 that is approximately twice as large as either of the chambers 303 and 304 and a compressor output chamber 330. Fuel injectors 306, 307, and 308 may, respectively, supply the chambers 303, 304, and 305 with fuel. The compressor chambers 310, 320, and 330 are not injected with fuel when it is used as a compressor, though they may be when an engine of the explosion output type is desired.

The chambers 310, 320, and 330 may be connected to engine chambers 303, 304, and 305 by ports 311, 321, and 331, respectively, which are opened and closed by respective electrically-actuated valves 312, 322, and 332. The valves 312, 322, 332 may be biased to a closed position by springs 313, 323, 333, so as to remain closed until the pressure against them exceeds a predetermined amount. When this pressure is exceeded, they may open and stay open until they are closed by solenoids 314, 324, 334. The air from the chambers 310, 320, and 330 may empty, respectively, into pressure pipes 315, 325, and 335, which join together at 326. The air may then, for example, be injected into the interior tube 316 of a jet-propelled propeller 317 from which it is expelled into the air through the openings 318 and 319.

There may be two sets of exhaust ports 340, 341 with closure members 342, 343, one located approximately at the midpoint of the stroke of each piston 300, 301. Similarly, air intake ports 344, 345 located on the opposite side of the cylinder 302 from the exhaust ports may be opened and closed by valves 346, 347 for supplying air from a supercharger 348. The supercharger 348 may be of the turbo-supercharger type or may be of any desired type of supercharger.

The engine may be started by an auxiliary compressor 350 (or a compressed air storage tank) with a port 351 and closure valve 352 which is opened only during the first half-stroke of the engine to introduce compressed air that moves the pistons 300 and 301 apart, thus compressing air in the ends of the cylinder. Then the valve 352 is closed against its port 351.

Photoelectric cells are used for actuating some of the valves concerned. Only two photocells are required, and they may be located in a variety of ways so long as one of them is properly positioned near the outer end of the stroke of one piston and the other is located near the inner stroke of one piston. Both may be on the same piston or they may be on different pistons. In the drawings, a source of light 360 is positioned near the left-hand end of the cylinder 302 so that its beam of light is directed into the eye of a photocell 361. The beam is interrupted when the piston 300 is at or near the limit of its outer stroke. A second source 362 of light is positioned so that its beam is directed at the photocell 363. This beam is interrupted by the piston 301 at or near the limit of its inner stroke.

The photocell 361 controls a relay 364 while the photocell 363 controls a relay 365. Each of the relays 364, 365 is wired to control the solenoids that open the valves. When the beam from the light source 360 is interrupted, the photocell 361 actuates the relay 364 so as to close the valve 352 at the first half-stroke when the engine is started, and the valve will subsequently remain closed. Every time the piston 300 interrupts the beam of light from the photocell 361, the relays 364 energize solenoids 370, 371 to open the exhaust ports 340, 341 and also energize solenoids 372, 373 to open the intake ports 344, 345. At the same time, the solenoids 314, 324 are closed to isolate the chambers 310, 320 from the chambers 303, 304. Also, at the same time the injectors 306, 307 inject and ignite fuel in the engine chambers 303, 304.

*Operation of the device of Figs. 12 through 14*

The auxiliary compressor 350 or compressed air storage tank is used to start the engine by sending air into the cylinder through the port 351 and valve 352. This compressed air moves the pistons 300 and 301 apart with the result that air is compressed in the ends of the cylinder. The valve 352 is then closed, and the auxiliary compressor is not used any more during the operation of the device. As the pistons 300 and 301 move apart, they pass beyond the intake ports 344 and 345 and the exhaust ports 340 and 341. These ports are then opened by their valves, and air from the supercharger 348 flows in the ports 344 and 345 to scavenge out the air into the exhaust ports 340 and 341.

Fig. 12 shows the engine at the start of operations with the pistons 300 and 301 ready to move outwardly when air is forced in from the compressor 350 through the port 351. At this stage the valves 312, 322, and 332 are all closed. As the pistons 300, 301 move outwardly, they compress gas into the outer engine chambers 303, 304, and when a predetermined pressure is reached the bias of the springs 313, 323 is overcome and the valves 312, 322 open. This position is shown in Fig. 13.

When the pistons 300 and 301 reach the outer end of their stroke, as shown in Fig. 14, the piston 300 interrupts the beam of light from the source 360 and the photocell 361 energizes the relay 364 which in turn energizes its solenoids. The exhaust ports 340, 341 and the intake ports 344, 345 are then opened. The supercharger 348 then sends air through the ports 344, 345 to scavenge the air out through the exhaust cylinders and supply new air for the other half-stroke of the engine. The starting valve 352 is closed on the first half-stroke and remains closed. The valves 312 and 322 are closed, the compressed gases going out the pipes 315 and 325 into the propeller 317. The injectors 306, 307 spray fuel into the chambers 303, 304. The fuel ignites, and the heated compressed gases drive the pistons 300, 301 in toward the center.

At the inner limit of the stroke of the pistons 300, 301, the beam to the photocell 363 is broken, and the relay 365 is energized. As the pistons 300 and 301 move toward each other, they compress gas into the engine chamber 305, and the valve 332 opens when the design pressure is reached. When the photocell beam 363 is broken, the relay 365 closes the valve 332, opens the exhaust valve 342, 343, and the intake valve 346, 347 and injects fuel into the chamber 305 through the injector 308. The resultant explosion sends the pistons 300, 301 outwardly against and a new cycle is begun.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. An engine-compressor including in combination at least one compressor cylinder; free piston means reciprocable therein; at least one generally enclosed chamber means adjacent said cylinder and connected therewith by a port; valve means for closing said port as said piston means approaches said port, so as to isolate the air compressed in the enclosed chamber from the portion of the air compressed in the same stroke in said cylinder; means for injecting fuel into the compressed air in said cylinder; means for atcuating said valve means and said fuel-injecting means when said piston means approaches an extreme stroke position adjacent said port; a toggle mechanism for moving said valve means into closed position and for holding it there while fuel is exploded in said cylinder; and means for exploding the said injection of fuel, the gases from said enclosed chamber being used to supply external power, while the expanded gases in the cylinder are used to drive the piston means away from said port and to drive said piston means until a similar explosion again supplies power for driving said piston means.

2. An engine-compressor, including in combination an engine cylinder; an engine free piston reciprocable in said cylinder; means defining a chamber adjacent said cylinder and connected thereto by a port; valve means for closing said port, so as to isolate the air in said chamber from the air in said cylinder on the same side of said piston; means for injecting fuel into said cylinder; a light source on one side of said cylinder sending a light beam across said cylinder; a photoelectric cell on the opposite side of said cylinder in the path of said light beam; and means, normally de-energized when said light beam is uninterrupted, energized when said engine piston interrupts said light beam by interposing between said light source and said cell, for causing said valve means to close said port and for actuating said fuel-injecting means.

3. An engine-compressor, including in combination; an engine housing providing an engine cylinder having a combustion chamber thereadjacent; a piston reciprocable toward and away from said combustion chamber in said engine cylinder to compress air toward said combustion chamber; means providing an output chamber connected to said combustion chamber by a separating port; a separating valve movable to open and close said separating port and having a stem; spring means normally urging said separating valve to a closed position until opened when the pressure in said engine cylinder and combustion chamber reaches a predetermined value; a sleeve around said valve stem and having an end wall adapted to engage the end of said stem in a lost motion connection; a toggle between said engine housing and said sleeve, comprising two toggle links pivotally joined by a follower pin, one link pivotally mounted to said housing through a torsion spring, the other pivotally mounted to said sleeve; means for straightening said toggle to close said separating valve and hold it closed against large pressures over a portion of the engine cycle where said engine pistons are close together; a fuel injector for said combustion chamber; and means for actuating said fuel injector after said toggle has closed said separating valve.

4. An engine-compressor, including in combination: an engine housing providing an engine cylinder having a combustion chamber adjacent its center, an intake port on one side of and spaced from the center, and an exhaust port on the other side of and spaced from the center; a pair of recoil cylinders coaxial with said engine cylinder, one adjacent each end thereof; a pair of opposed engine pistons reciprocable toward and away from each other in said engine cylinder; a recoil piston in each said recoil cylinder rigidly joined to an engine piston; a rigid lever positioned centrally outside said engine cylinder and pivotally mounted to said engine housing; a link pivotally mounted to each end of said lever and pivotally mounted on a said recoil piston, each said link comprising two rigid members joined by a longitudinally flexible and laterally rigid spring with stop members limiting the longitudinal compression of said spring; a pair of links in toggle connection between said lever and said engine housing, said toggle being almost in a straight line when said engine pistons are at the inner limits of their strokes, while the link connected to said lever is almost parallel to said lever when said engine pistons are at the outer limits of their strokes; a connecting rod pivoted to said toggle; a crankshaft pivotally mounted to the other end of said connecting rod; means providing an output chamber connected to said combustion chamber by a separating port; a separating valve movable to open and close said separating port; means normally urging said separating valve to a closed position until opened when the pressure in said engine cylinder and combustion chamber reaches a predetermined value; a toggle means between said engine housing and said valve; a toggle cam rotated by said crankshaft and engaging said toggle to straighten it and close said separating valve and hold it closed against large pressures over a portion of the engine cycle where said engine pistons are close together; a fuel injector for said combustion chamber; and a fuel-injector cam rotated by said crankshaft and operatively connected to said fuel injector to actuate it after said toggle cam has closed said separating valve.

5. An engine-compressor, including in combination: an engine housing providing an engine cylinder having a combustion chamber adjacent its center, a sleeve intake port on one side of and spaced from the center, and a sleeve exhaust port on the other side of and spaced from the center; a pair of recoil cylinders coaxial with said engine cylinder, one adjacent each end thereof; a pair of opposed engine pistons reciprocable toward and away from each other in said engine cylinder to open said sleeve ports and close them and compress air toward said combustion chamber; a recoil piston in each said recoil cylinder rigidly joined to an engine piston; a rigid lever outside said engine cylinder and pivotally mounted thereon centrally thereof; a link pivotally mounted to each end of said lever and pivotally mounted on a said recoil piston, each said link comprising two rigid members joined by a longitudinally flexible and laterally rigid spring with stop members limiting the longitudinal compression of said spring; a toggle between said lever and said engine housing, comprising two toggle links pivotally mounted to each other, one pivotally mounted to said lever, the other pivotally mounted to said housing, the three pivots being almost in a straight line when said engine pistons are at the inner limits of their strokes, while the pivot for said lever and those on said one toggle link are almost in a straight line when said engine pistons are at the outer limits of their strokes; a connecting rod pivotally mounted at one end on said toggle; a crankshaft having a crank pin pivotally mounted to the other end of said connecting rod; a camshaft driven by said crankshaft; means providing an output chamber connected to said combustion chamber by a separating port; a separating valve movable to open and close said separating port and having a stem; spring means normally urging said separating valve to a closed position until opened when the pressure in said engine cylinder and combustion chamber reaches a predetermined value; a sleeve around said valve stem and having an end wall adapted to engage the end of said stem in a lost motion connection; a toggle between said engine housing and said sleeve, comprising two toggle links pivotally joined by a follower pin, one link pivotally mounted to said housing through a torsion spring, the other pivotally mounted to said sleeve; a toggle cam on said camshaft engaging said follower pin and straightening said toggle to close said separating valve and hold it closed against large pressures over a portion of the engine cycle where said engine pistons are close together; a fuel injector for said combustion chamber; and a fuel-injector cam on said camshaft and operatively connected to said fuel injector to actuate it after said toggle cam has closed said separating valve.

6. A piston compressor-engine which compresses both the engine air and the compressor air as a single gaseous mixture in one common cylinder, said engine air and compressor air later being separated while under pressure, said compressor-engine comprising: a piston; a cylinder in which said piston reciprocates in a compression stroke toward a first head at one end of said cylinder and an expansion stroke toward a second head at the other end, said cylinder having intake and exhaust sleeve ports intermediate said heads normally closed by said piston but opened by it during a latter part of its expansion stroke; supercharger means for scavenging and supercharging said cylinder through said sleeve ports when they are opened; a compressed-gas accumulator connected to said first head by a separating port; a separating valve for opening and closing said separating port; means for holding said valve closed at the beginning of said compression stroke and until the air between said piston and said first head has been compressed to a prescribed pressure, said valve then opening so that further movement of said piston on its said compression stroke forces a large proportion of its compressed air out through said separating port into said accumulator; means controlled by the position of said piston for closing said separating valve as said piston approaches the end of its comression stroke and for injecting fuel into said cylinder adjacent said first head, so that only that fraction of the air compressed by said piston which remains in said cylinder remains in contact with said piston to expand upon receiving the injection of fuel and to do work on said piston, moving it toward said second end of said cylinder; and means at said second end of said cylinder for returning said piston to said first end in another compression stroke after said piston has uncovered said intake and exhaust sleeve ports and after said supercharger has scavenged out the exhaust air and forced a fresh charge of air into said cylinder on the side of said piston nearer said first head.

7. A piston compressor-engine which compresses both the engine air and the compressor air mixed together in one common cylinder and then separates them near the end of the compression stroke, comprising two pistons; a cylinder in which both said pistons reciprocate and providing a compression chamber between said pistons, said cylinder having intake sleeve ports at one end of said chamber and exhaust sleeve ports at the other end of said chamber, said sleeve ports normally being covered by said pistons and opened at the latter portion of their expansion strokes away from each other; supercharger means connected to said intake ports for sending air into said chamber when said intake ports are open to scavenge said chamber and provide a fresh supply of air on which said pistons act when they move toward each other on their compression stroke; means for synchronizing the movement of said pistons so that they reciprocate 180° out of phase at all times; a compressed gas accumulator outside said cylinder and connected thereto by a separating port adjacent the center of said chamber; a separating valve for opening and closing said separating port; pressure-responsive means for holding said separating valve closed against its said port at the beginning of said compression stroke and until the two opposed pistons compress the air in said chamber to a prescribed pressure, whereupon said valve is opened and said pistons force air from said chamber through said separating port into said accumulator; closure means operated by the position of said piston for closing said separating valve at a predetermined position; means actuated by said closure means for positively holding said separating valve closed during a predetermined portion of the piston cycle and then releasing said closure means so as to return said separating valve to control by said pressure-responsive means; fuel injection means actuated by said closure means to send fuel into said chamber after closure of said separating valve to ignite the air remaining in said chamber and move said pistons apart on their expansion stroke; and means at the opposite ends of said cylinder for returning said pistons on a compression stroke.

8. The device of claim 7 wherein said last named means comprises means for compressing recoil air upon outward movement of said pistons away from each other, said recoil air storing energy and then giving it back to said pistons.

9. The device of claim 7 wherein said last-named means comprises two secondary chambers, one at each end of said cylinder, secondary accumulators each connected to said chambers by separating ports, secondary valves for said last-mentioned ports, and means for operating said valves like the other separting valve between said pistons, for driving said pistons from both ends of their stroke.

References Cited in the file of this patent

UNITED STATES PATENTS

| 876,020 | Salter | Jan. 7, 1908 |
|---|---|---|
| 925,673 | Zook | June 22, 1909 |
| 1,099,083 | Duc | June 2, 1914 |
| 1,293,508 | Moore | Feb. 4, 1919 |
| 1,455,795 | Logan | May 22, 1923 |
| 1,603,005 | Flam | Oct. 12, 1926 |
| 1,930,786 | Witkiewicz et al. | Oct. 17, 1933 |
| 2,038,442 | Pescara | Apr. 21, 1936 |
| 2,070,617 | Offutt | Feb. 16, 1937 |
| 2,072,948 | Geffs | Mar. 9, 1937 |
| 2,193,261 | Thomson | Mar. 12, 1940 |
| 2,485,154 | Kalitinsky | Oct. 18, 1949 |
| 2,502,127 | Chittenden et al. | Mar. 28, 1950 |
| 2,539,913 | Koepcke | Jan. 30, 1951 |
| 2,638,989 | Brzozowski | May 19, 1953 |
| 2,688,371 | Pesaro | Sept. 7, 1954 |

FOREIGN PATENTS

| 434,921 | Great Britain | Sept. 11, 1935 |